United States Patent
Simeon

(10) Patent No.: US 7,114,847 B2
(45) Date of Patent: Oct. 3, 2006

(54) TOTAL TEMPERATURE PROBE AND METHOD OF DETERMINING TOTAL TEMPERATURE

(75) Inventor: Marc Simeon, Vendome (FR)

(73) Assignee: Thales, Neuilly sur Seine (FR)

( * ) Notice: Subject to any disclaimer, the term of this patent is extended or adjusted under 35 U.S.C. 154(b) by 107 days.

(21) Appl. No.: 10/517,426

(22) PCT Filed: Jun. 13, 2003

(86) PCT No.: PCT/FR03/01800

§ 371 (c)(1),
(2), (4) Date: Dec. 8, 2004

(87) PCT Pub. No.: WO03/106948

PCT Pub. Date: Dec. 24, 2003

(65) Prior Publication Data

US 2005/0190816 A1     Sep. 1, 2005

(30) Foreign Application Priority Data

Jun. 14, 2002  (FR) ................................. 02 07376

(51) Int. Cl.
G01K 13/02  (2006.01)
G01K 1/16   (2006.01)

(52) U.S. Cl. ..................................... 374/135; 374/138

(58) Field of Classification Search ................ 374/135, 374/138
See application file for complete search history.

(56) References Cited

U.S. PATENT DOCUMENTS

| | | | | |
|---|---|---|---|---|
| 2,942,472 A | * | 6/1960 | Harney | ........................ 374/138 |
| 4,821,566 A | * | 4/1989 | Johnston et al. | ........... 73/178 R |
| 5,025,661 A | * | 6/1991 | McCormack | ................. 73/180 |
| 5,653,538 A | * | 8/1997 | Phillips | ........................ 374/138 |
| 6,979,119 B1 | * | 12/2005 | Wellman et al. | ............. 374/141 |
| 2002/0122459 A1 | * | 9/2002 | McFarland et al. | .......... 374/179 |
| 2003/0005779 A1 | * | 1/2003 | Bernard | .................... 73/861.65 |
| 2003/0115948 A1 | * | 6/2003 | Rouse et al. | .............. 73/170.02 |
| 2004/0095984 A1 | * | 5/2004 | Severson | ....................... 374/16 |
| 2005/0103927 A1 | * | 5/2005 | Barre et al. | ..................... 244/10 |

FOREIGN PATENT DOCUMENTS

EP          1491900 A2  * 12/2004
WO   WO03050496 A2  *  6/2003

* cited by examiner

*Primary Examiner*—Diego Gutierrez
*Assistant Examiner*—Mirellys Jagan
(74) *Attorney, Agent, or Firm*—Lowe Hauptman & Berner, LLP

(57) ABSTRACT

The invention relates to a total temperature probe for an aircraft and to a method of determining temperature by means of such a probe. The total temperature measurement probe comprises a base, an external face of which is intended to be mounted so as to be substantially coplanar with a skin of the aircraft, and a mast that projects from the base and supports an active part of the probe. The probe furthermore includes several temperature sensors placed on, the external face of the base and distributed around the mast. The method consists in determining the total temperature of the air surrounding the probe on the basis of the temperature measurement carried out in the active part (4) of the probe and on the basis of the maximum difference that exists between the measurements made by the temperature sensors.

6 Claims, 1 Drawing Sheet

TOTAL TEMPERATURE PROBE AND METHOD OF DETERMINING TOTAL TEMPERATURE

CROSS-REFERENCE TO RELATED APPLICATIONS

The present Application is based on International Application No. PCT/FR03/01800, filed on Jun. 13, 2003, which in turn corresponds to FR 02/07376 filed on Jun. 14, 2002, and priority is hereby claimed under 35 USC §119 based on these applications. Each of these applications are hereby incorporated by reference in their entirety into the present application.

The invention relates to a total temperature probe and to a method of determining temperature by means of such a probe.

A total temperature probe measures the total temperature of the air flow in which it is placed. When the speed of the air flow is high enough, a temperature measurement element placed in the probe takes the temperature of the air thanks to the convection effect. When the speed of the flow is low or zero, the measurement is affected by various factors, among which is the heating needed for deicing and the solar radiation, which factors have the effect of raising the temperature of the probe to a value above that of the surrounding air.

BACKGROUND OF THE INVENTION

It is possible to correct the measurement error due to the influence of the heating by means of calibrations and by modeling, taking into account several parameters such as the heating power dissipated in the probe and the speed of the flow, which also has to be measured, or by the probe itself in the case of a multifunction probe, such as that disclosed in French patent application FR 2 802 647 filed on Dec. 17, 1999.

Such modeling does not take into account the rise in temperature of the probe that is caused by solar radiation. More precisely, when an aircraft on which the probe is mounted is in flight phase, the speed of the flow of air surrounding the probe is sufficient for the effect of solar radiation to be negligible and the modeling described above is sufficient. However, when the aircraft is placed on the ground, the effect of solar radiation becomes important and the temperature measurement is impaired.

A first solution for avoiding the effect of solar radiation consists in fitting the probe in a region protected from sunshine, for example under the fuselage. As a result, the installation constraints may be contradictory with in-flight use of the probe. The regions protected from sunshine are, in general, aerodynamically disturbed by the landing gear.

SUMMARY OF THE INVENTION

Another solution for eliminating the effect of heating and of solar radiation when the speed of the flow is low or zero consists in causing forced convection around the measurement element of the probe. This requires a pressure source capable of a certain flow rate, which causes, for example by suction, movement of air around the measurement element of the probe.

The latter solution is highly prejudicial from the standpoint of fitting the probe on the aircraft. It requires the installation of specific air suction ducts in the vicinity of each temperature probe and the fitting of a pressure generator. This solution is therefore very expensive.

The object of the invention is to alleviate the above mentioned problems by allowing the temperature of the probe to rise due to solar radiation and by correcting the measurement error that it induces.

For this purpose, the object of the invention is to propose means for correcting the measurement error due to the effect of solar radiation on the temperature measurement carried out by the probe.

More precisely, the subject of the invention is a total temperature measurement probe for an aircraft, comprising a base, an external face of which is intended to be mounted so as to be substantially coplanar with a skin of the aircraft, and a mast that projects from the base and supports an active part of the probe, characterized in that it furthermore includes several temperature sensors placed on the external face of the base and distributed around the mast.

The subject of the invention is also a method of determining temperature by means of the total temperature probe defined above and characterized in that the total temperature of the air surrounding the probe is determined on the basis of the temperature measurement carried out in the active part of the probe and on the basis of the maximum difference that exists between the measurements made by the temperature sensors.

Of course, the invention is not limited to a probe having only temperature sensors. The invention may especially be employed in multifunction probes having, in addition to temperature sensors, other types of sensors such as pressure sensors.

BRIEF DESCRIPTION OF THE DRAWINGS

The invention will be more clearly understood and other advantages will become apparent on reading the detailed description of one embodiment of the invention, this description being illustrated by the appended drawing in which.

DETAILED DESCRIPTION OF PREFERRED EMBODIMENT

Figure 1:
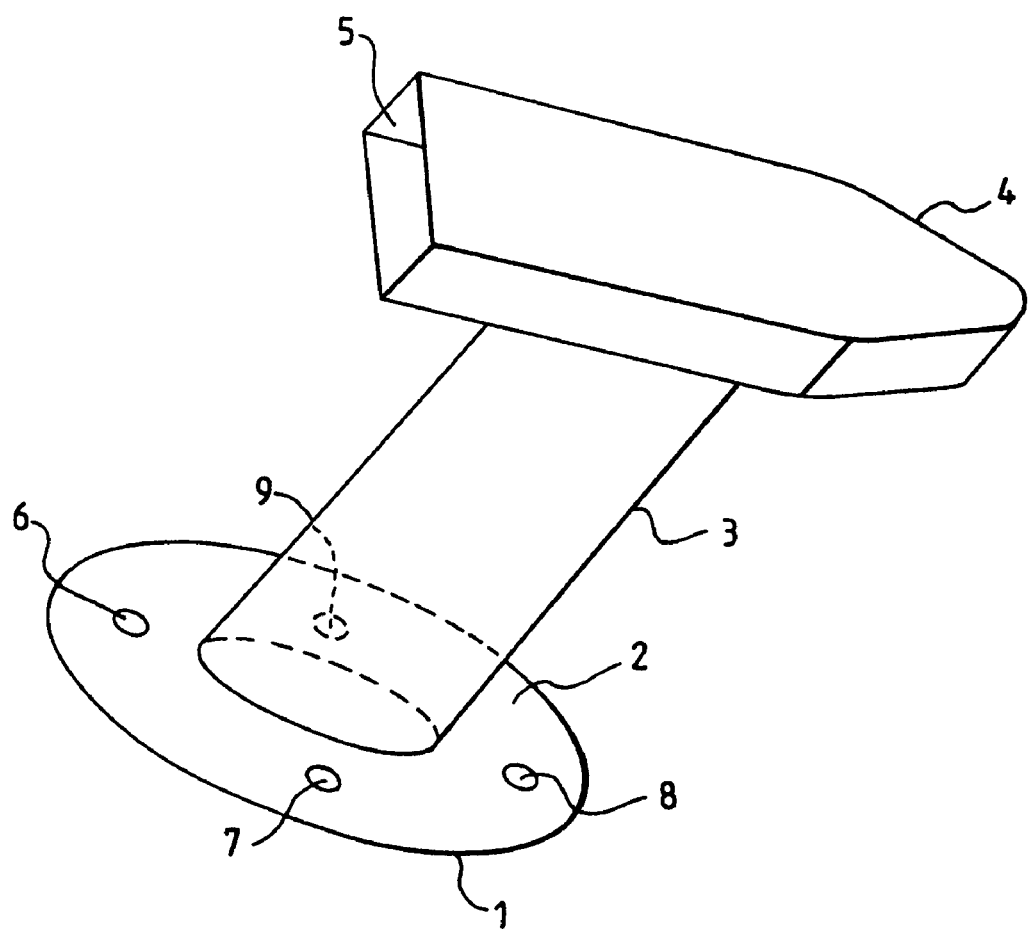
FIG. 1 shows, in perspective, a total temperature measurement probe.

The probe shown in FIG. 1 comprises a base 1, an external face 2 of which is intended to be mounted so as to be substantially coplanar with a skin of an aircraft on which the probe is mounted. The probe also includes a mast 3 that projects from the base 1. The mast 3 supports an active part 4 of the probe. The active part 4 includes an air inlet 5 via which a stream of air, the total temperature of which it is desired to determine, penetrates. Inside the active part 4, a temperature sensor performs the total temperature measurement by the probe. For further details relating to the construction of the active part 4 of the probe, the reader may refer to the French patent application published under the number FR 2 802 647.

According to the invention, the probe has several temperature sensors 6 to 9 placed on the external face 2 of the base 1. The sensors 6 to 9 are distributed around the mast 3. These temperature sensors 6 to 9 each comprise, for example, a thermocouple whose hot junction is located level with the external face 2 of the base 1. In FIG. 1, four sensors 6 to 9 have been shown. Of course, the invention is not limited to four sensors. The number of temperature sensors and their positions may be determined, during design of the probe, according to its shape.

Advantageously, the temperature sensors 6 to 9 are thermally insulated from the external face 2 of the base 1. Thus, they will be less disturbed by any conduction tending to make the temperature of the base 1 uniform.

Advantageously, the probe includes at least three temperature sensors. Thus, when the probe is subjected to solar radiation, at least one of the sensors is in the shadow of the mast 3 or of the active part 4.

To determine the total temperature of the air surrounding the aircraft, by means of the probe described above, the maximum difference that exists between the various measurements made by the temperature sensors 6 to 9, one of the sensors 6 to 9 being in the shade, is determined. The maximum difference is representative of the solar radiation reaching the probe. Next, the temperature measurement performed by means of the active part 4 of the probe can be corrected using this maximum difference.

The correction of the temperature measurement made by means of the active part 4 can be calibrated, for example by varying the radiation reaching the probe and by noting, for a given total temperature of the air surrounding the probe, the values measured by the active part 4 of the probe and by the sensors 6 to 9, and doing so for various values of the radiation. This calibration makes it possible to determine the difference between the measurement made by the active part 4 of the probe and the actual total temperature of the air surrounding the probe on the basis of the measurements made by the temperature sensors 6 to 9. This calibration may be carried out for several levels of radiation reaching the probe. Each level of radiation will give a maximum difference between the measurements made by the temperature sensors and a difference between the measurement made by the active part 4 and the actual total temperature of the air surrounding the probe. The actual total temperature may be measured by the active part 4 in the absence of any radiation.

During normal use of the probe, it will be possible to determine, from the maximum difference between the measurements made by the temperature sensors 6 to 9, a correction to be applied to the measurement made by the active part 4 of the probe, for example by interpolation between results obtained for each level of radiation during the calibration.

Advantageously, the total temperature of the air surrounding the probe is determined as a function of the speed of the air surrounding the probe. This is because the effect of solar radiation decreases when the speed of the air surrounding the probe increases. As previously, the correction to be made to the temperature measurement carried out by the active part 4 of the probe can be calibrated. This calibration may be carried out in a wind tunnel, by varying the speed of an airflow surrounding the probe while illuminating it with a given level of radiation.

The invention claimed is:

1. A total temperature measurement probe for an aircraft, comprising:
   a base, an external face of which is intended to be mounted so as to be substantially coplanar with a skin of the aircraft, and a mast that projects from the base and supports an active part of the probe, wherein it furthermore includes several temperature sensors placed on the external face of the base and distributed around the mast.

2. The probe as claimed in claim 1, wherein it includes at least three temperature sensors.

3. The probe as claimed in claim 1, wherein the temperature sensors are thermally insulated from the external face of the base.

4. The probe as claimed in claim 3, wherein it includes at least three temperature sensors.

5. A method of determining temperature by means of a total temperature probe as claimed in claim 1, wherein the total temperature of the air surrounding the probe is determined on the basis of the temperature measurement carried out in the active part of the probe and on the basis of the maximum difference that exists between the measurements made by the temperature sensors.

6. The method as claimed in claim 5, wherein the total temperature of the air surrounding the probe is determined as a function of the speed of the air surrounding the probe.

* * * * *